July 12, 1949.  W. C. HAEFNER  2,476,190
SICKLE BAR ATTACHMENT

Filed Feb. 28, 1947  2 Sheets-Sheet 1

INVENTOR.
William C. Haefner
BY Zugelter & Zugelter
Attys.

July 12, 1949.　　　W. C. HAEFNER　　　2,476,190
SICKLE BAR ATTACHMENT
Filed Feb. 28, 1947　　　2 Sheets-Sheet 2
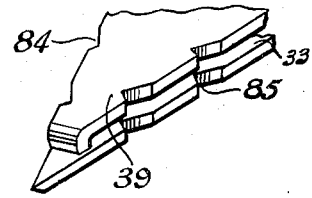
Fig. 8.
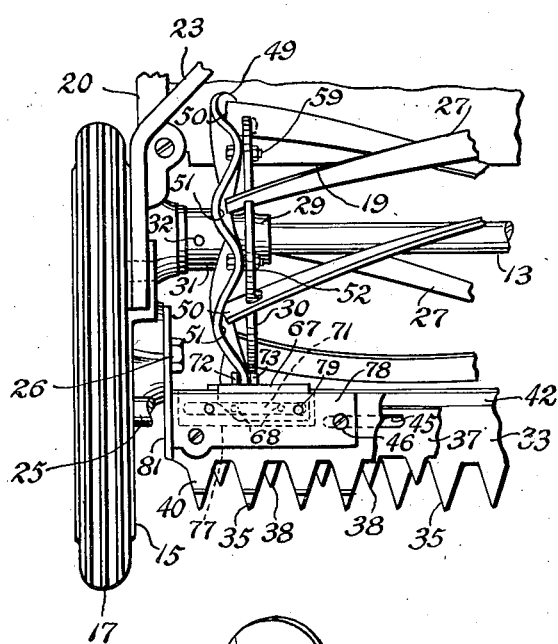
Fig. 6.
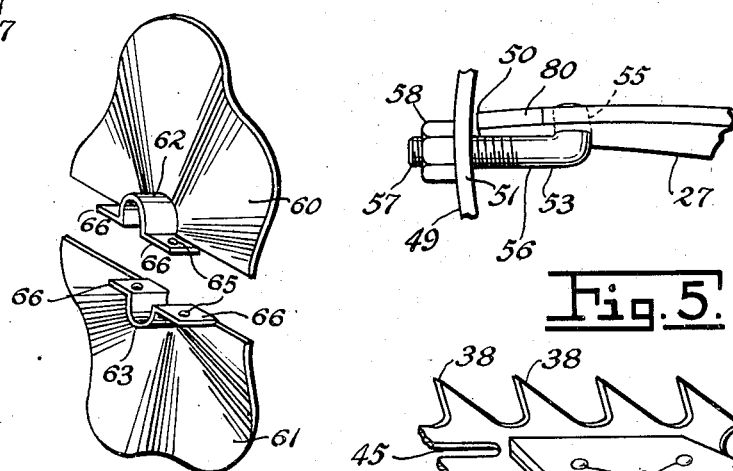
Fig. 5.
Fig. 7.　　　Fig. 4.
INVENTOR.
William C. Haefner
BY
Zugelter & Zugelter
Attys.

Patented July 12, 1949

2,476,190

UNITED STATES PATENT OFFICE 2,476,190

SICKLE BAR ATTACHMENT

William C. Haefner, Newport, Ky., assignor to The Auto Sun Products Company, Cincinnati, Ohio, a corporation of Ohio Application February 28, 1947, Serial No. 731,674

10 Claims. (Cl. 56—238)

REISSUED
SEP 19 1950
RE 23269

This invention relates to improvements in lawn mowers of the conventional reel type, and particularly to a sickle bar attachment to be detachably mounted thereon, the said attachment being applicable to power lawn mowers as well as to hand operated mowers.

One of the objects of the invention is to provide an easily detached sickle bar adapted to cut tall grass, weeds, and other growth in advance of the reel cutter of the mower.

Another object is to provide a sickle bar attachment so positioned on the lawn mower as to greatly reduce the danger of the cutting blades contacting stones, sticks, and other hard objects with attendant damaging results.

A further object is to provide a sickle bar attachment which may be quickly applied to most standard reel type lawn mowers of the capacity or width of cut, with the use of simple tools in the hands of unskilled operators.

Another object is to provide an attachment of the type referred to, which is highly simplified in design so that it may be manufactured expeditiously from common materials, with substantial savings in labor and material costs.

Another object of the invention is the provision of a simplified sickle bar attachment, which may be quickly dismantled when necessary for cleaning, repairing, and the like, without requiring the services of a skilled mechanic.

The foregoing and other objects and advantages are attained by the means described herein and illustrated upon the accompanying drawings, in which:

Fig. 4 is an enlarged perspective view of the cam follower plate which forms a detail of the invention.

Fig. 5 is an enlarged fragmental view showing one method of applying a cam to the reel cutter blades.

Fig. 6 is a fragmental top plan view showing a modified method of attaching the cam to the mower reel assembly.

Fig. 7 is a perspective view of a cam in two parts for application to a reel shaft or shaft collar.

Fig. 8 is a perspective view of a modified tooth configuration.

As anyone operating a conventional rotary reel type of lawn mower can testify, such a mower is ineffective for cutting tall grass, grass heads, weed spikes and the like, for the reason that such tall growth is pushed over and laid flat upon the earth before the reel blades and stationary knife can reach them. Accordingly it is desirable to furnish a device, such as is described herein, which will extend forwardly of the reel blades so as to cut off any tall growth in its path at a height sufficiently low to enable the reel blades and cutter knife to make a finish cut of the lawn. With this object in view, the present invention proposes to mount a sickle bar upon the conventional mower frame, said bar being designed to incorporate various features of advantage as generally stated in the preceding objects of the invention.

Figure 1:
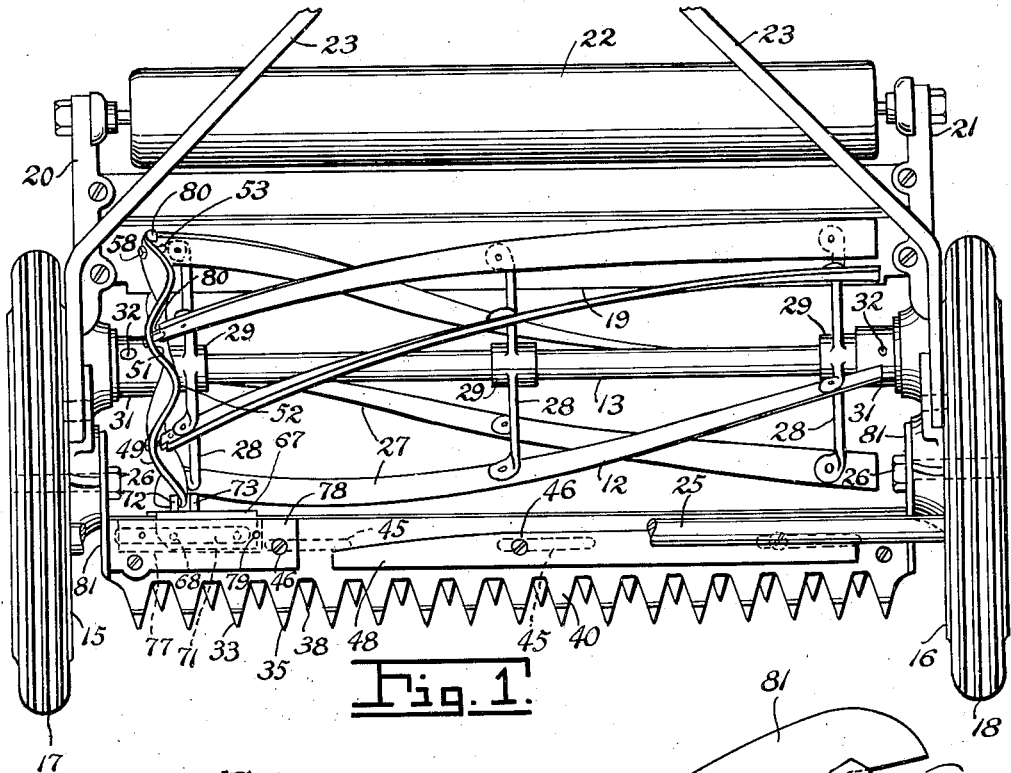
Fig. 1 is a top plan view of a conventional reel type lawn mower showing the improved sickle bar attached thereto, part of the mower being broken away in the interest of clarity of disclosure.

With reference to Fig. 1, there is shown the conventional lawn mower comprising the rotary reel cutter assembly 12 mounted on the reel shaft 13. This shaft is journaled in side frames 15 and 16, which carry the traction wheels 17 and 18. As is customary, the reel 12 is motivated by gearing within the wheels 17 and 18 and the side frames 15 and 16. The straight cutter knife 19, which co-acts with the reel cutter 12 to perform the final cutting action, is adjustably mounted between extensions 20 and 21, said extensions being integral with or mounted upon the side frames 15 and 16. The roller 22 is rotatively journaled in the outer ends of the extensions 20 and 21. The mower handle, not shown, is attached to the pivoted handle brackets 23 at the point where the said brackets converge. The side frames 15 and 16 generally are maintained in spaced parallelism by means of a frame spacer rod 25. The wheels 17 and 18 are rotatably mounted upon the side frames by means of axles 26, which usually are in the form of a bolt or some form of removable stud. As previously recited, the ends of the reel shaft 13 are rotatably journaled in bearings supported by the side frames 15 and 16 and driven by suitable gearing upon each advancing movement of the mower.

A multiplicity of blades 27 are fixedly mounted upon the shaft 13 by means of plates or spiders 28, which also serve to maintain the curved blades 27 in spaced relationship. The plates 28 may be in the form of radial arms extending from hubs 29 fixed to the reel shaft 13, as shown in Fig. 1, or may be substantially disc-like in form, as shown at 30 in Fig. 6, the blades 27 being suitably attached thereto. Spacer collars 31 may be disposed between the endmost hubs 29 and the side frames 15 and 16, and fixed to the reel shaft 13 by means of set screws 32.

Figures 2, 3:
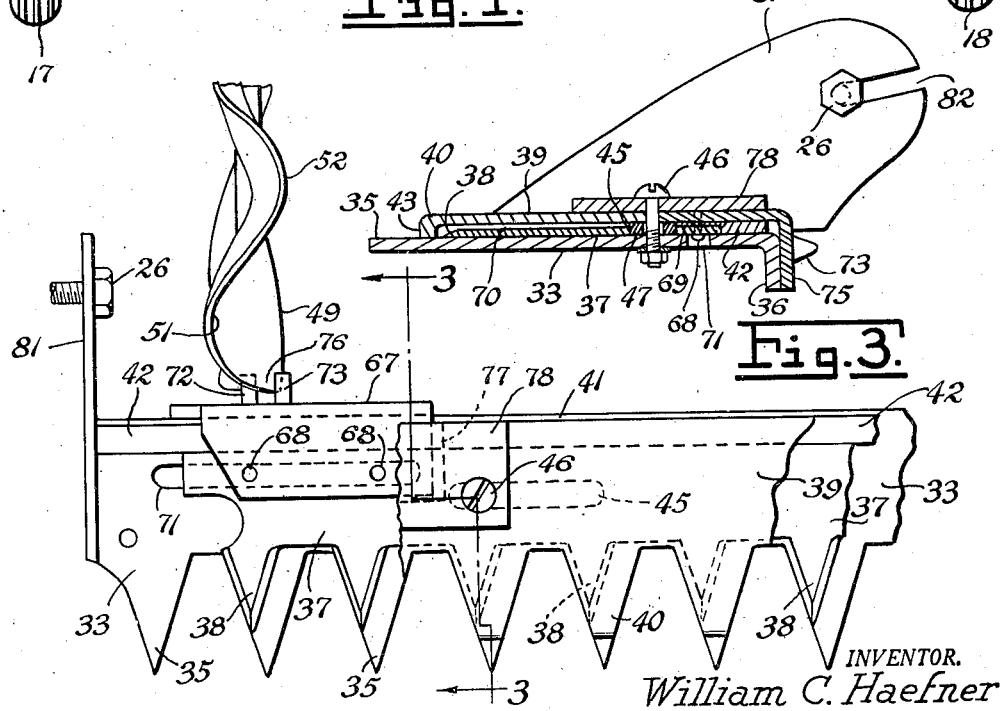
Fig. 2 is an enlarged fragmental top plan view of the attachment, part being broken away.
Fig. 3 is an enlarged cross-sectional view taken on line 3—3 of Fig. 2.

The sickle bar attachment as illustrated by Figs. 1, 2, and 6 comprises a stationary cutter bar 33 of substantially flat metal, having formed along its leading edge a series of substantially triangular cutter teeth 35. In order to impart the desired rigidity to the stationary cutter bar, the bar may be provided with a depending flange 36 forming the rear edge of said bar, as shown in cross-section in Fig. 3.

Upon the stationary cutter bar rests a substantially flat movable cutter bar 37, having triangular teeth 38 formed along the leading edge thereof, said teeth being arranged to overlie the teeth of the stationary cutter bar 33, so that a shearing action results from longitudinal reciprocations of the movable cutter bar 37. The extent of reciprocation of the movable cutter bar approximates the distance between the pointed ends of adjacent teeth.

To maintain the cutter bars in substantially flatwise contact, there is provided an overlying stationary guard plate 39 which may, if desired, be provided with teeth 40, of substantially the same size as the stationary cutter bar teeth 35 which they overlie. At its rear edge 41, the guard plate may be supported in spaced relationship to the stationary cutter bar 33 by means of a fixed longitudinal spacing strip 42 riveted, welded, or otherwise fastened to the upper surface of the stationary cutter bar. The thickness of the spacing strip 42 will slightly exceed the thickness of the movable cutter bar 37 so that the latter may reciprocate freely between the stationary cutter bar 33 and the guard plate 39. As a means of maintaining parallelism between the stationary cutter bar and the guard plate, the teeth of the latter may be formed with blunt ends and these ends turned down to form flanges 43, as shown in Fig. 3. In this case, the length of the flanges 43 will approximate the thickness of the spacer strip 42. Besides maintaining the guard plate 39 and the stationary cutter bar 33 in spaced parallelism, the flanges 43, by resting upon the upper surface of the stationary cutter bar teeth 35, serve to prevent the guard plate teeth from accidentally or otherwise being bent into contact with the teeth 38 of the movable cutter bar, thereby placing a frictional strain upon the last named teeth in the performance of their shearing function.

Guide means for the movable cutter bar may consist of a series of elongated longitudinal slots 45 in the movable cutter bar, adapted to accommodate the screws 46 which clamp the guard plate 39 and the stationary cutter bar 33 together. Interposed between the last two named elements and in the slots 45 are the washers 47, the thickness of which is substantially the same as that of the spacer strip 42, as indicated in Fig. 3. It is to be understood, of course, that suitable apertures are provided in the guard plate and the stationary cutter bar for the insertion of the screws 46 therethrough. A reinforcing strip 48, riveted, welded, or otherwise fastened to the upper surface of the guard bar, may be provided for imparting rigidity to said guard bar.

Means for reciprocating the movable cutter bar 37 comprises a cam 49 in the form of a ruffled or radially undulated disc, suitably fixed against rotation to one end of the reel cutter assembly 12, as depicted in Figs. 1 and 6. The Fig. 1 method of attaching the cam 49 to the reel cutter assembly is clearly shown in Fig. 5. In this form the cam 49 has ruffles or undulations equal to the number of curved cutter blades 27, a construction which permits the ends 50 of the cutter blades to substantially abut the hollows 51 between the crests or peaks 52 of the cam undulations or ruffles. A threaded stud 53 having a head 55 bent at right angles to its body 56 is disposed longitudinally of each cutter blade 27 at the cutter blade end 50, the head 55 being inserted through a suitable aperture in the blade 27 and securely fixed therein by peening. The threaded ends 57 of the studs, which extend beyond the ends of the cutter blades, are inserted through apertures in the hollows 51 of the cam 49 and nuts 58 applied for firmly and rigidly fixing the cam to the cutter reel assembly 12 against rotation thereon. By way of explanation, the ruffled cam disc 49 is substantially of the same diameter as the cutter reel assembly 12. The method of cam application just described may be used on mowers having the spider type reels 28 shown in Fig. 1.

On mowers having the solid disc type of reel, as shown at 30 in Fig. 6, the cam may be applied by means of bolts 59 inserted through registering apertures in the reel 30 and the crests 50 of the cam, as clearly delineated in Fig. 6. The number of undulations or ruffles is equal to the number of cutter blades 27. The ends 50 of the blades lie in the hollows 51 between the crests or peaks 52 of the ruffled cam 49.

A third method of cam application is envisioned, wherein the cam is fabricated in two parts, as shown at 60 and 61 in Fig. 7. Semicircular flanges 62 and 63, laterally extending from the approximate center of the ruffled semi-discs 60 and 61, are adapted to grip the spacer collar 31 by firmly clamping thereon by means of bolts inserted through the apertures 65 of the clamping lugs 66. When thus installed, the two parts 60 and 61 become a unified cam of substantially the same configuration as the cam 49 depicted in Figs. 1 and 6.

Referring again to the sickle bar attachment, a cam follower plate 67, in association with the movable cutter bar 37, is provided at one end of said cutter bar. As exemplified in Fig. 4, this may be in the form of an angle plate riveted to the movable cutter bar 37, as indicated at 68. A thin shim 69 may be interposed between the cam follower plate 67 and the movable cutter bar 37 to compensate for the space 70 between the guard plate 39 and the movable cutter bar 37, as shown in Fig. 3. An elongated slot 71, for clearing the heads of rivets 68, is provided in the stationary cutter bar 33. Prongs or fingers 72 and 73 are struck from a flange 75 depending from the cam follower plate 67, said fingers extending laterally from the outer face of the flange 75 and in spaced parallelism, the space therebetween forming the cam follower 76, as indicated in Fig. 4. Since clearance must be provided for the cam follower plate 67, a portion of the guard plate 39 may be either depressed upwardly, or cut away as indicated by the dotted lines at 77 in Figs. 1, 2, and 6, to provide clearance sufficient to permit longitudinal reciprocation of the cam follower plate 67 with its associated movable cutter bar 37. In the example illustrated, cut grass and other extraneous matter are precluded from entering the sickle bar at the clearance 77, by a cover plate 78 welded or otherwise fixed to the guard plate 39 immediately above said clearance. If desired, oil holes 79 may be provided in the cover plate for the application of a lubricant to the moving parts of the sickle bar.

It will thus be understood that when the sickle bar attachment is properly mounted on the frame of a lawn mower, each forward movement of said mower will cause the cam 49 to rotate with the cutter reel assembly 12, while the ruffled sinuous or sinusoidal periphery of the cam, being positioned within the cam follower 76, will cause the movable cutter bar 37 to reciprocate longitudinally between the stationary cutter bar 33 and the guard plate 39. This reciprocation will continue as long as the reel assembly 12 is rotating, causing a shearing action between the sharpened teeth 38 of the movable cutter bar and the teeth 35 of the stationary cutter bar, thus shearing off any succulent vegetation within the path of the sickle bar in preparation for the final cutting by the reel cutter blades 27 passing over the straight cutter knife 19. As will be understood, as the ruffled cam 49 is rotated, the undulated sides of the cam bear against the inner faces of the cam follower fingers 72 and 73, first on one finger and then on the other with each passing through of a ruffle, causing a reciprocation of the movable cutter blade 37. In the case of the curved cutter blade ends 50 abutting the hollows 51 of the cam 49, a portion of the blade may be removed, as indicated at 80 in Figs. 1 and 5, to permit clearance of the cam follower finger 73 as the cam 49 is rotated.

Although the sickle bar attachment as above described may be mounted in any suitable manner upon the mower frame, a preferred form of mounting is illustrated in Fig. 3 of the drawing. The mounting means in this instance comprises a pair of obliquely upstanding brackets 81, one at each end of the sickle bar, and apertured or slotted, as at 82, to receive the bolts or studs 26 which furnish the axles upon which the mower wheels 17 and 18 rotate. The mounting brackets 81 may be fabricated separately and suitably fixed to the sickle bar, or they may be formed integrally with the stationary cutter bar 33 by the simple expedient of providing sufficient material to permit turning up the stationary cutter bar ends to form said brackets. A slot as shown at 82 is preferable to a hole, since in that case it is necessary only to loosen the bolts or studs 26 in order to slip the brackets 81 between the loosened bolt heads and side frames 15 and 16. By then drawing the bolts tight, the sickle bar attachment is firmly mounted in position, ready to attack all unsightly vegetation common to lawns, such as plantain, buckhorn, dandelion and grass seed heads.

It should be noted that the horizontal plane of the sickle bar is only slightly below the center line of the wheels 17 and 18, a position high enough to prevent the cutter teeth from coming into contact with ordinary stones, sticks, dog bones, and other hard objects which might be concealed in the grass of a lawn, yet low enough to permit the rotating cutter blades 27 to carry the sickle-cut vegetation to the straight cutter knife 19 for the final cut. Ordinary sickle bars, which are mounted close to the earth, are always in danger of striking such hard objects as listed above, with consequent danger of breaking or otherwise mutilating the sickle bar teeth. Such disadvantages have been obviated by the device of the present invention.

As illustrated by Fig. 8 of the drawings, the cutter guard plate 39 and the underlying stationary cutter bar 33 may be notched to increase the shearing effect of the movable cutter bar which reciprocates between them in the fashion illustrated by Fig. 6. The notches, indicated at 84 and 85 upon the parts 39 and 33, respectively, preferably are vertically aligned so that a lower notch and a corresponding upper notch may cooperate in holding any upstanding tall vegetation while the reciprocating cutter bar shears it off. The notches may be slanted forwardly as shown, and staggered at opposite sides of the tapered teeth, to augment the holding function referred to.

To render the sickle bar attachment inoperative, it is necessary only to swing it bodily forwardly and upwardly about the mounting elements or bolts 26, a distance sufficient to disengage the follower 76 from the cam periphery. This will permit use of the mower in the conventional manner. Alternatively, the sickle bar attachment may be dismounted bodily from the mower, of course, by merely loosening the bolts 26 to release the brackets 81.

As hereinbefore stated, the device of the present invention is equally applicable to hand driven and power driven lawn mowers. It is to be understood, of course, that various changes and modifications may be made in the structural details of the mechanism, within the scope of the appended claims, without departing from the spirit of the invention.

What is claimed is:

1. A reel and sickle lawnmower having a frame and a pair of traction wheels, said mower comprising a reel and blade assembly, the reel being rotatably mounted on a shaft operatively connected to the wheels of the mower to be driven thereby, a sickle assembly disposed forwardly of said reel and secured at its opposite ends to the lawnmower frame, said sickle assembly having a reciprocating sickle bar disposed between a stationary cutter bar and a stationary guard, the reciprocating bar having at one end thereof adjacent one end of the reel a cam follower, and a circular cam, the surface of which is undulating in a direction parallel to said reel shaft, disposed between one wheel and the end of the reel adjacent thereto, the cam being coaxial with the reel shaft and secured to the reel, said cam being in operative engagement with said cam follower and adapted to impart a reciprocating motion to the sickle bar as the reel rotates about said shaft.

2. A lawnmower according to claim 1, characterized by the fact that the cam comprises a circular sheet metal disc which is deformed with respect to a plane normal to the axis of rotation to simulate a sinusoid.

3. A reel and sickle lawnmower having a frame and a pair of traction wheels, said mower comprising a reel and cutter blade assembly, the reel being rotatably mounted on a shaft operatively connected to the wheels of the mower to be driven thereby, a sickle assembly disposed forwardly of said reel and secured at its opposite ends to the lawnmower frame, said sickle assembly having a reciprocating sickle bar disposed between a stationary cutter bar and a stationary guard, said sickle assembly being mounted slightly below the center line of the tractor wheels but above the reel cutter blade, the reciprocating bar having at one end thereof adjacent one end of the reel a cam follower, and a circular cam the surface of which is undulating in a direction parallel to said reel shaft disposed between one wheel and the end of the reel adjacent thereto, the cam being coaxial with the reel shaft and secured to the reel, said cam being in operative engagement with said cam follower and adapted to impart a reciprocating motion to the sickle bar as the reel rotates about said shaft, whereby the sickle bar is reciprocated as the reel rotates and the sickle bar makes a first cut at an elevation higher than the reel cutter blade and the reel cutter blade assembly makes a final cut at a lower level.

4. A lawn mower having a pair of spaced driving wheels, a multi-blade reel cutter disposed between said wheels, said reel being coupled to said wheels to be rotated about its longitudinal axis by said wheels as the lawnmower is propelled, a sickle bar disposed forward of said reel and mounted at the ends thereof on said mower frame, said reel having a cam between one of said wheels and the end of the reel adjacent said wheel mounted to rotate with said reel about the longitudinal axis thereof, said cam being sinusoidal with its peaks and valleys at right angles to its plane of rotation, the reciprocating sickle bar having a pair of spaced lugs projecting towards said reel and being disposed one on each side of said cam whereby as said reel rotates, the lugs are engaged by the peaks of said cam causing the sickle bar to be driven with a reciprocating motion.

5. A lawn mower having a pair of spaced wheels, a reel cutter located between the wheels and the reel thereof connected to be driven by said wheels as the lawn mower is propelled, and a sickle assembly mounted forward of the reel and between the wheels of said mower, said sickle assembly including a stationary cutter bar secured at its ends to the frame of the mower, a reciprocating sickle bar on said stationary cutter bar and a guard for holding the sickle bar on the cutter bar, said sickle bar having at one end adjacent one end of said reel a pair of spaced lugs projecting rearwardly towards said reel, and a cam between one of said wheels and the end of said reel adjacent said lugs, said cam being mounted to rotate with said reel about the axis of rotation thereof, the periphery of said cam extending between said lugs and having a sinusoidal form the peaks and valleys of which extend in a direction substantially parallel to the axis of said reel, whereby in response to rotation of said reel, the lugs are engaged by the peaks of said cam and the reciprocating sickle bar is reciprocated.

6. A lawn mower according to claim 4 characterized by the fact that the cam is of sheet metal and is secured to the blades of said reel.

7. A lawn mower according to claim 4 characterized by the fact that the cam is of sheet metal and is secured to the shaft of said reel.

8. A lawn mower according to claim 5 characterized by the fact that the cam is of sheet metal and is secured to the blades of said reel.

9. A lawn mower according to claim 5 characterized by the fact that the cam is of sheet metal and is secured to the shaft of said reel.

10. A lawn mower according to claim 5 characterized by the fact that alternate peaks of said sinusoid are disposed inwardly of and between the ends of pairs of blades of said reel and that the ends of said blades extend into the hollows of the oppositely extending peaks of said sinusoid.

WILLIAM C. HAEFNER.

REFERENCES CITED

The following references are of record in the file of this patent:

UNITED STATES PATENTS

| Number | Name | Date |
| --- | --- | --- |
| 642,485 | Pierson | Jan. 30, 1900 |
| 648,600 | Stair | May 1, 1900 |
| 660,455 | Pelletreau | Oct. 23, 1900 |
| 977,569 | Streibich | Dec. 6, 1910 |
| 1,552,940 | Aurele | Sept. 8, 1925 |
| 1,617,045 | Darling | Feb. 8, 1927 |
| 1,913,094 | Smath et al. | June 6, 1933 |